United States Patent [19]

Natarajan

[11] Patent Number: 5,210,753
[45] Date of Patent: May 11, 1993

[54] ROBUST SCHEDULING MECHANM FOR EFFICIENT BAND-WIDTH USAGE IN MULITICELL WIRELESS LOCAL NETWORKS

[75] Inventor: Kadathur S. Natarajan, Millwood, N.Y.

[73] Assignee: International Business Machines Corporation, Armonk, N.Y.

[21] Appl. No.: 785,643

[22] Filed: Oct. 31, 1991

[51] Int. Cl.$^5$ ............................................. H04J 3/16
[52] U.S. Cl. ................................... 370/95.1; 455/33.4
[58] Field of Search ................ 455/33.4; 370/50, 79, 370/80, 94.1, 95.1, 95.3; 379/59, 60; 340/825.06

[56] References Cited

U.S. PATENT DOCUMENTS

| | | | |
|---|---|---|---|
| 4,596,042 | 6/1986 | Stangl | 455/33.4 |
| 5,040,238 | 8/1991 | Comroe et al. | 455/33.4 |

FOREIGN PATENT DOCUMENTS

2739561  3/1979  Fed. Rep. of Germany ..... 455/33.4

Primary Examiner—Douglas W. Olms
Assistant Examiner—Melvin Marcelo
Attorney, Agent, or Firm—Jack M. Arnold

[57] ABSTRACT

A wireless communications network includes a local area network connected to a plurality of nodes which perform bidirectional wireless communication with mobile stations as controlled by a controller. Each node has a geographic area, termed a cell, within which mobile stations can communicate with the node associated with the cell. A cell interference graph is read into the controller, and a maximal independent set of nodes is determined. Each node in the maximal independent set of nodes is put in a set termed ACTIVE for performing wireless communication with mobile stations in their respective cells. Nodes which are not in the maximal independent set of nodes is put in a set termed WAITING to wait for permission to enter the set ACTIVE. A node in the set ACTIVE which has completed communications sends a completion signal to the controller. The controller then examines which of the nodes in the set WAITING is not adjacent to another node in the set ACTIVE, and such nodes are entered in a set termed CANDIDATES. Nodes in the set CANDIDATES are moved to the set ACTIVE according to a predetermined criteria.

8 Claims, 7 Drawing Sheets

ROBUST SCHEDULING MECHANM FOR EFFICIENT BAND-WIDTH USAGE IN MULITICELL WIRELESS LOCAL NETWORKS

FIELD OF THE INVENTION

The invention is in the field of wireless communications, and in particular is directed to runtime scheduling of traffic served by a multicell wireless network. Specifically, the invention is directed to making dynamic scheduling decisions in a state-dependent manner for overlapping cells.

BACKGROUND OF THE INVENTION

In a local area network (LAN) a user, such as a portable computer equipped with communication capability, gains access to the LAN via a physical connection in order to communicate with remote facilities or use shared resources, such as file servers, print servers, etc. In a stationary mode of operation, all users are static and each user gains access to the network via a fixed homing point. However, in a mobile environment users are free to change their physical location and cannot be restricted to gain access to the network only through one of several homing points attached to the LAN. In a mobile environment the homing points are fixed base stations that communicate with the mobile users through a wireless link. Examples of wireless links include radio frequency (RF) links, microwave links and infrared (IR) links.

Of interest herein are wireless communication networks having overlapping coverage areas or cells wherein the same frequencies are employed for the uplink and the downlink, respectively, within each coverage area. The use of the same frequencies in overlapping communication cells has the advantage that it eliminates a requirement that the mobile users switch frequencies when migrating from one cell to another. An additional advantage is that the effective wireless bandwidth can be increased by spatial reuse of frequencies in non-overlapping cells. This technique is called Frequency Reuse.

However, the transmission and reception of messages in a cell of a multicell network, of the type that employs identical communication frequencies in different cells, requires control of interference between users. This interference may occur from several sources including uplink transmissions from mobile users that lie in overlapping areas between adjacent cells and downlink transmissions from base stations if their overlapping cell areas contain one or more mobile users.

The following U.S. Patents and articles are made of record for teaching various aspects of mobile communication.

The following two U.S. Patents show communication systems having overlapping coverage areas. U.S. Pat. No. 4,597,105, Jun. 24, 1986, entitled "Data Communications System having Overlapping Receiver coverage Zones" to Freeburg and U.S. Pat. No. 4,881,271, issued Nov. 14, 1989, entitled "Portable Wireless Communication Systems" to Yamauchi et al. Yamauchi et al. provide for a hand-off of a subscriber station from one base station to another by the base station continually monitoring the signal strength of the subscriber station.

The following U.S. patents teach various aspects of wireless communication networks.

In U.S. Pat. No. 4,792,946, issued Dec. 20, 1988, entitled "Wireless Local Area Network for Use in Neighborhoods" S. Mayo describes a local area network that includes transceiver stations serially coupled together in a loop.

In U.S. Pat. No. 4,777,633, issued Oct. 11, 1988, entitled "Base Station for Wireless Digital Telephone System" Fletcher et al. describe a base station that communicates with subscriber stations by employing a slotted communications protocol.

In U.S. Pat. No. 4,730,310, issued Mar. 8, 1988, entitled "Terrestrial Communication System" Acampora et al. describe a communications system that employs spot beams, TDMA and frequency reuse to provide communication between a base station and remote stations.

In U.S. Pat. No. 4,655,519, issued May 12, 1987, entitled "Wireless Computer Modem" Kirchner et al. disclose a wireless modem for transferring data in a computer local area network.

In U.S. Pat. No. 4,639,914, issued Jan. 27, 1987, entitled "Wireless PBX/LAN System with Optimum Combining" Winters discloses a wireless LAN system that employs adaptive signal processing to dynamically reassign a user from one channel to another.

In U.S. Pat. No. 4,837,858, issued Jun. 6, 1989, entitled "Subscriber Unit for a Trunked Voice/Data Communication System" Ablay et al. disclose a trunked voice/data subscriber that operates in either a voice mode or one of three data modes.

In U.S. Pat. No. 4,852,122, issued Jul. 25, 1989, entitled "Modem Suited for Wireless Communication Channel Use" Nelson et al. disclose a wireless communication system and, specifically, a modem that communicates digital data with data terminal equipment.

In U.S. Pat. No. 4,926,495, issued May 15, 1990 entitled "Computer Aided Dispatch System" Comroe et al. disclose a computer aided dispatch system that includes a master file node and a plurality of user nodes. The master file node maintains a record for each subscriber and automatically transmits an updated record to each dispatcher attached to a subgroup in which the subscriber operates.

In U.S. Pat. No. 4,456,793, issued Jun. 26, 1984, W. E. Baker et al. describe a cordless telephone system having infrared wireless links between handsets and transponders. The transponders are wired to subsystem controllers which are in turn wired to a system controller. The central controller polls the cordless stations every 100 milliseconds to detect cordless station locations and to identify "missing" cordless stations.

In U.S. Pat. No. 4,807,222, issued Feb. 21, 1989 N. Amitay describes a LAN wherein users communicate with RF or IR signals with an assigned Regional Bus Interface Unit (RBIU). Protocols such as CSMA/CD and slotted ALOHA are employed in communicating with the RBIUs.

In commonly assigned U.S. Pat. No. 4,402,090, issued Aug. 30, 1983, F. Gfeller et al. describe an infrared communication system that operates between a plurality of satellite stations and a plurality of terminal stations. A host computer communicates with the terminal stations via a cluster controller and the satellite stations, which may be ceiling mounted. Communication with the terminal stations is not interrupted even during movement of the terminal stations.

In U.S. Pat. No. 4,573,206, issued Feb. 25, 1986, Granel et al. describe a cellular radio system where the control channel assignment to mobile stations is done by the base station distributing information such as number of groups and group codes.

In U.S. Pat. No. 4,551,852, issued Nov. 5, 1985, Granel et al. describe a cellular radio system for spreading the volume of traffic over different control channels.

In U.S. Pat. No. 4,789,983, issued Dec. 6, 1988, Acampora et al. describe a multiple access protocol design for an indoor radio network. The proposed centralized approach uses a modified polling protocol to achieve communications between remote stations.

In IBM Technical Disclosure Bulletin, Vol. 20, No. 7, December 1977 F. Closs et al. describe the use of both line-of-sight and diffuse transmission of infrared signals for wireless communications between a ceiling-based controller and a plurality of terminals.

In IBM Technical Disclosure Bulletin, Vol. 24, No. 8, page 4043, January 1982 F. Gfeller describes general control principles of an infrared wireless network incorporating multiple ceiling mounted transponders that couple a host/controller to multiple terminal stations. Access to the uplink channel is controlled by a Carrier Sense Multiple Access/Collision Detection (CSMA/CD) method.

In U.S. patent application Ser. No. 07/605,291 filed Oct. 29, 1990, entitled "Scheduling Methods for Efficient Frequency Reuse in a Multi-Cell Wireless Network Served By A Wired Local Area Network" by K.S. Natarajan, which is assigned to the assignee of this invention, a method includes a first step of receiving a message from a wired network with at least one base station. The message is a message type that authorizes a base station or base stations to transmit on a wireless network. A second step of the method is accomplished in a response to the received first message, and initiates wireless communications with any mobile communication units that are located within a communication cell served by the at least one base station. In one embodiment the message circulates around a token ring and activates base stations in turn. In another embodiment disjoint groups of base stations are predetermined by graphical techniques, including graph coloring methods. The predetermined group information is maintained by a network controller that thereafter selectively activates the base stations within the different groups.

What is not taught by this prior art, and what is thus an object of the invention to provide, are communication methodologies that realize an efficient scheduling and frequency reuse in a wireless communications network that is served by a wired network. This is accomplished through the use of a centralized method that makes scheduling decisions in a state-dependent manner.

DISCLOSURE OF THE INVENTION

A wireless communications network includes a local area network connected to a plurality of nodes which perform bidirectional wireless communication with mobile stations as controlled by a controller. Each node has a geographic area, termed a cell, within which mobile stations can communicate with the node associated with the cell. A cell interference graph is read into the controller, and a maximal independent set of nodes is determined. Each node in the maximal independent set of nodes is put in a set termed ACTIVE for performing wireless communication with mobile stations in their respective cells. Nodes which are not in the maximal independent set of nodes is put in a set termed WAITING, to wait for permission to enter the set ACTIVE. A node in the set ACTIVE which has completed communications sends a completion signal to the controller. The controller then examines which of the nodes in the set WAITING is not adjacent to another node in the set ACTIVE, and such nodes are entered in a set termed CANDIDATES. Nodes in the set CANDIDATES are moved to the set ACTIVE according to a predetermined criteria.

BRIEF DESCRIPTION OF THE DRAWINGS

The above set forth and other features of the invention are made more apparent in the ensuing detailed description of the invention when read in conjunction with the attached Drawing, wherein:

FIG. 7 is a detailed flow chart of block 64 of FIG. 6a.

DESCRIPTION OF THE PREFERRED EMBODIMENT

A multicell wireless network served by a high-speed backbone network must make effective spatial reuse of bandwidth in the wireless cells that generally operate at speeds considerably less than the backbone network. Users gain access to the network via one of a finite number of base stations that are physically attached to and interconnected by a wired backbone network. The physical link from the user to the base station is a wireless communication link. Each base station serves as a bridge between the wired backbone network on one side and a collection of portable computer users that can communicate with the base station using a wireless communication link. A cell corresponding to a base station consists of the geographic area within which a user can communicate with the base station. In general cells will overlap in coverage. It is assumed that a user in an overlap area will register with one of the base stations, called its Owner, that serves the communication needs of the user while he is within the cell covered by the owner.

In the multicell wireless network systems under consideration, users in a cell access the network by sharing the wireless channel in a multiaccess-broadcast mode. It is assumed that within each cell, users transmit on a shared uplink at a certain frequency $f_{up}$ and receive messages on a broadcast channel from a corresponding base station at a different frequency $f_{down}$. The same frequencies $f_{up}$ and $f_{down}$ are reused in each cell in the multicell wireless network.

The reuse of frequencies in cells results in intercell interference due to two basic reasons.

First, simultaneous message transmissions from multiple users to the same base station result in a collision and the base station cannot receive correctly any of the messages transmitted. Second, simultaneous message transmissions from multiple base stations to the same user will also result in a collision and the user will not receive any of them correctly. Intercell interference in such multiple overlapping cell networks, if not properly controlled, can lead to poor performance. If the network is heavily used and not controlled at all (i.e., users and base station, can transmit at will anytime they have a message), then an increasing number of collisions will occur and this can accelerate the depletion of battery power in the portable computers carried by the mobile users. On the other hand, total control of the network (a situation in which the base stations and individual mobile users are coordinated and scheduled for message transmissions in a collision-free manner), in a cost-efficient implementation appears very difficult in practice. This invention adopts an intermediate approach in which the granularity of network control is at the level of scheduling cells for wireless operation. This means, the wireless operation of individual cells are controlled with a controller using dynamic scheduling mechanisms. Wireless operations within a cell (between mobile units and the base station) are permitted only during intervals of time designated by the controller.

Figure 1:
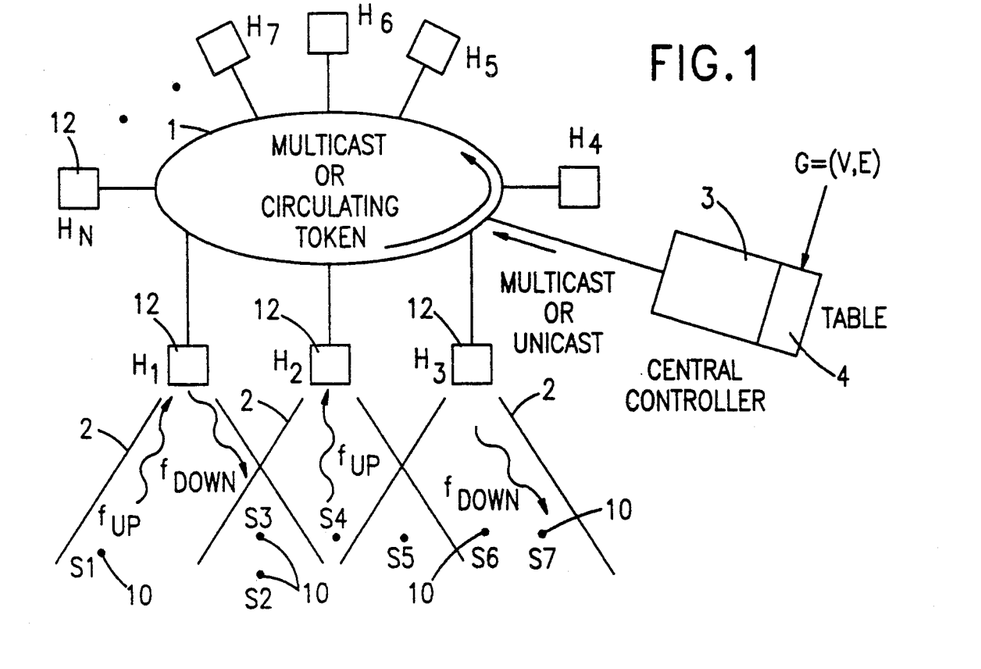
FIG. 1 is a schematic representation of a token ring LAN having a plurality of base stations and a wireless network having overlapping communication cells within which mobile communication units freely migrate.

Referring to FIG. 1 there is shown a typical mobile office communication environment. Users having portable data processing devices, referred to herein as mobile communication units or mobile units 10, are not restricted to gain access to a TOKEN-RING COMMUNICATION NETWORK 1 via predetermined homing points. Other wired networks such as FDDI and Ethernet can also be used. Instead, there are provided a finite number of devices, referred to herein as base stations, or nodes 12, that are attached to the token-ring network 1 at specific points. The terms base station and node will be used interchangeably. Each base station 12 has both processing and storage capability to perform store-and-forward communication functions. Each base station 12 functions as a bridge between the wired token-ring LAN and a collection of mobile units 10. The mobile units 10 are in bidirectional communication with the base stations 12 using wireless communication links. Within an area of wireless coverage of a base station, or communication cell 2, the mobile units 10 transmit on a shared uplink at a first frequency ($f_{up}$) and receive messages on a broadcast downlink channel from the base station 12 at a second frequency ($f_{down}$). The same frequencies ($f_{up}$) and ($f_{down}$) are reused within each cell in the mu wireless network.

One suitable token ring network for practicing the teaching of the invention is disclosed in "IBM Token-Ring Network:Architecture Reference", SC30-3374-02, Third Edition, Sep. 1989 ("IBM" is a registered trademark of the International Business Machines Corporation). It should be realized however that the teaching of the invention is not restricted to only this particular network configuration or to token ring networks in general but may, instead, be practiced with a number of different wired network types.

Each mobile unit 10 is associated with a unique base station (12), denoted as Owner (N), through which the mobile unit 10 accesses the wired token-ring network. A given base station (H) may own multiple mobile units 10 at the same time. The set of mobile units 10 owned by base station (H) is denoted Domain(H).

A suitable method for managing the ownership of the mobile units 10 is disclosed in commonly assigned U.S. patent application Ser. No. 07/605,723, filed on Oct. 29, 1991 and entitled "Distributed Control Methods for Management of Migrating Data Stations in a Wireless Communications Network" by Kadathur S. Natarajan.

The Owner-Domain relationships are logical and indicate for each base station (H) the set of mobile units 10 whose communication needs are managed by H. However, when a mobile unit 10 is in an overlapping area, its uplink transmissions can be heard by more than one base station 12, including its present owner and all potential owners in whose cells it is located. For example, in FIG. 1, uplink transmissions from S2 may interfere with transmissions by S1, S3, S4 and S5. However S2 does not interfere with S6 because S2 and S6 can never transmit to the same base station 12. For the same reason, S2 and S7 do not interfere with one another. The interference is not limited to uplink transmissions alone. A mobile unit 10, such as S2, that is within an overlapping cell area can receive broadcast signals from multiple base stations 12 (S2 can receive from both $H_1$ and $H_2$). If a mobile unit 10 simultaneously receives broadcast messages from more than one base station 12 a collision occurs and the messages are received erroneously.

Thus, the transmission and reception of messages in a cell of a multicell network of the type that employs identical communication frequencies in different cells requires control of interference. This interference may arise from several sources including an uplink transmission from mobile units 10 that lie in overlapping areas between adjacent cells 2 and from downlink transmissions from base stations 12 if their overlapping cell areas contain one or more mobile units 10.

Figures 2, 3, 5:
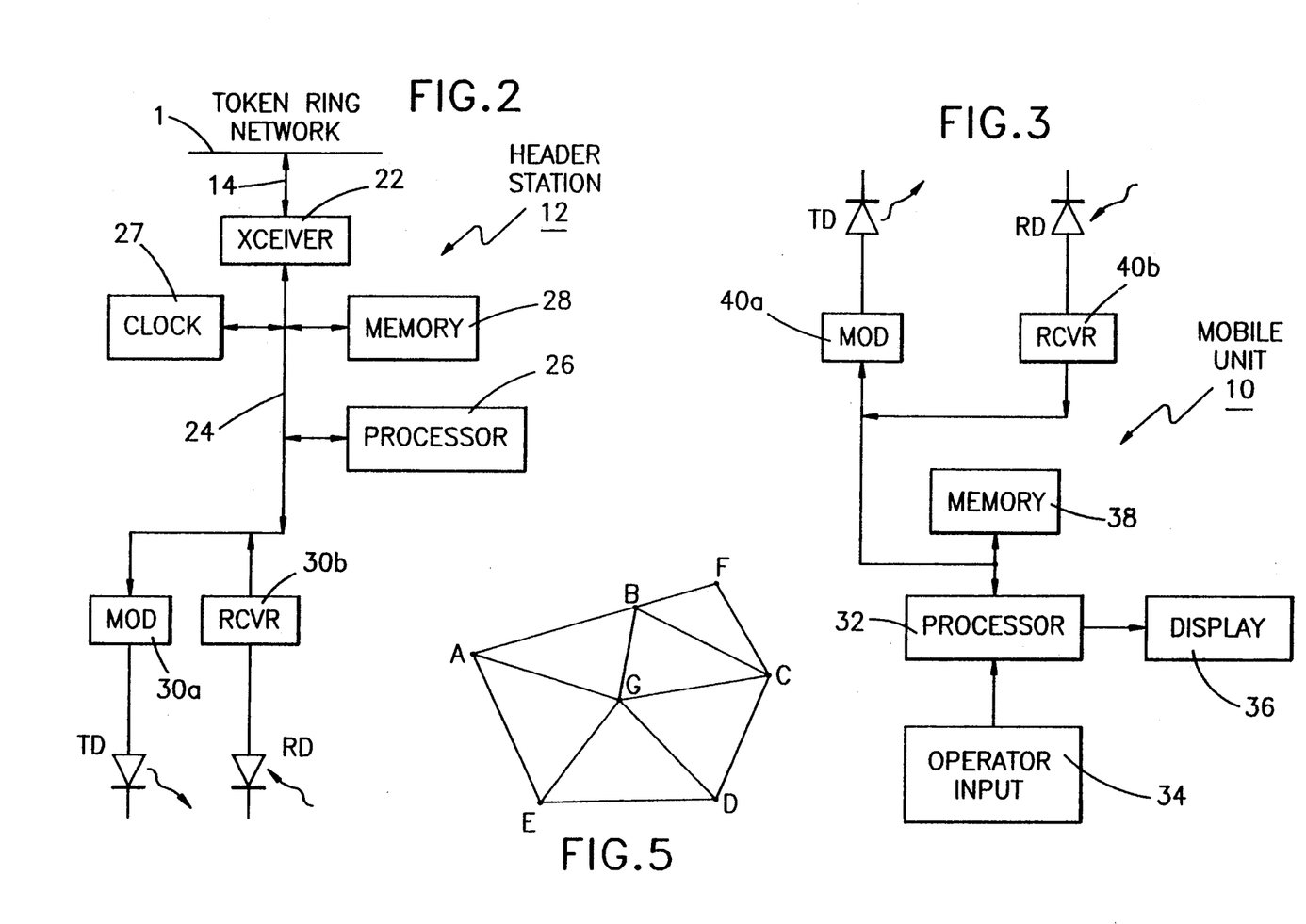
FIG. 2 is a block diagram illustrating one of the base stations of FIG. 1.
FIG. 3 is a block diagram illustrating one of the mobile communication units of FIG. 1.
FIG. 5 is a Region Interference Graph of the network of FIG. 4.

Before discussing the methods of the invention in further detail reference is made to FIGS. 2 and 3 wherein embodiments of the base stations 12 and mobile units 10, respectively, are shown in block diagram form. In a presently preferred embodiment of the invention the wireless communications channels are carried via an infrared (IR) data link. Presently available optical devices readily provide for operation within the range of approximately 750 nanometers to approximately 1000 nanometers.

Referring to FIG. 2 there is shown a simplified block diagram of the base station 12. The base station 12 is coupled to the LAN 1 via a connector 14. Connector 14 is coupled to a network adapter transceiver 22 which in turn is coupled to an internal bus 24. The base station 12 includes a processor 26 that is bidirectionally coupled to a memory 28 that stores program-related and other data, including packets of data transmitted to or received from the mobile units 10. Processor 26 also communicates with IR modulators and receivers; specifically a modulator 30a and a receiver 30b. The IR modulator and receiver have inputs coupled to suitable infrared emitting or receiving devices such as laser diodes, LEDs and photodetectors. In the illustrated embodiment the modulator 30a has an output coupled to a transmit diode (TD) and the receiver 30b has an input coupled to a receive photodiode (RD).

Referring now to FIG. 3 there is shown in block diagram form an embodiment of the mobile unit 10. Mobile unit 10 includes a processor 32 coupled to an operator input device 34 and also coupled to an operator display device 36. Operator input device 34 may be a keyboard or any suitable data entry means. Similarly, operator display device 36 may be a flat panel alphanumeric display or any suitable display means. Also coupled to processor 32 is a memory 38 that stores program-related data and other data, such as packets of information received from or intended to be transmitted to the base station 12 and also an identification of the mobile unit 10. Also coupled to processor 32 are a modulator 40a and a receiver 40b. The data receivers of FIGS. 2 and 3 include demodulators and filters and operate in a conventional manner to extract the modulated bit stream from the received optical signals. Similarly, the modulators of FIGS. 2 and 3 operate in a conventional manner to modulate the optical output in accordance with a transmitted bit stream. A preferred data transmission rate is in the range of approximately one to ten million bits per second (1-10 Mbits/sec), although any suitable data transmission rate may be employed.

In the optical communication system of the invention all wireless communication is between the base station 12 and the mobile units 10. There is no direct communication between the mobile units 10.

Although described in the context of a wireless network employing an IR medium it should be realized that the method of the invention may also be practiced with other types of wireless networks that employ, by example, radio frequency (RF) and microwave mediums.

Figure 4:
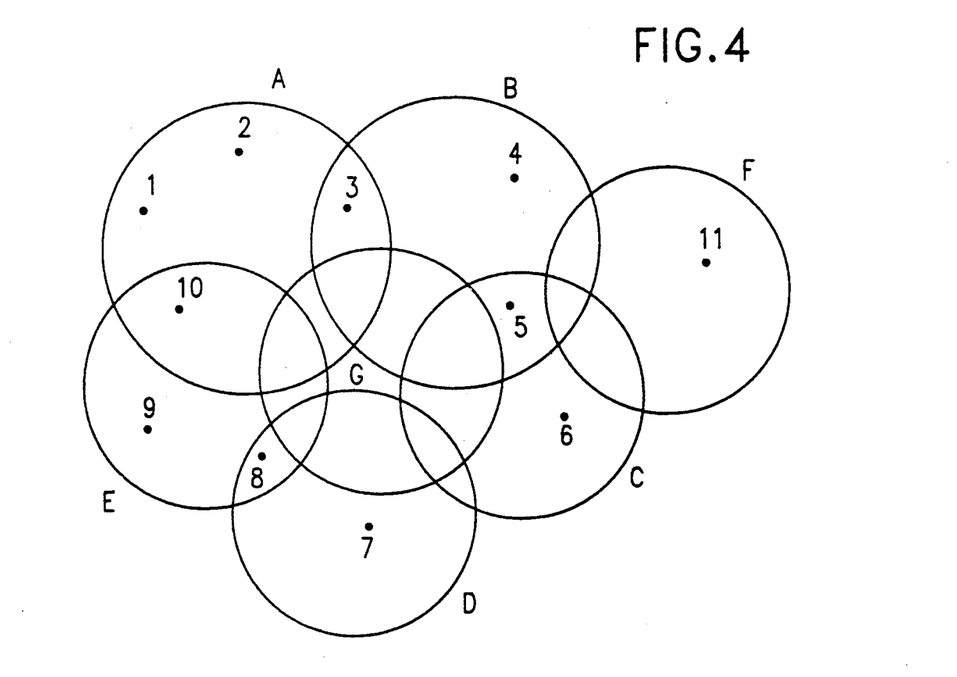
FIG. 4 illustrates a multiple cell wireless network having overlapping communication cells and mobile communication units distributed within the cells.

For the purpose of illustration of a cell or region interference graph, consider a multi-cell wireless network shown in FIG. 4. The terms cell interference graph and region interference graph will be used interchangeably. The network consists of a set of seven cells $\{A,B,C,D,E,F,G\}$ and 11 mobile units 10 numbered 1 through 11. Given the predetermined knowledge of cells and their overlap characteristics, there is defined a Cell or Region Interference Graph, or RIG, as follows. The RIG has a plurality of vertices, each of which corresponds to a single cell of the multicell network. Two vertices of the RIG are considered to be connected if and only if the corresponding cells provide overlapping coverage, that is, if simultaneous wireless communication in the cells will interfere with one another. The RIG corresponding to the network of FIG. 4 is shown in FIG. 5 and has seven vertices, corresponding to the intersections of the seven cells of FIG. 4.

A multicell wireless network can be modeled as an undirected graph $G=(V,E)$. V represents the set of cells. An edge $(i,j) \in E$ if the corresponding cells, Cell i and Cell j overlap in their coverage. Such a graph is called the Cell Interference Graph or Region Interference Graph of the wireless network. For the multicell wireless network shown in FIG. 4, the corresponding cell interference graph is shown in FIG. 5.

For the graph in FIG. 5, a partitioning of cells could be as follows:

Group 1 = $\{A, F, D\}$
Group 2 = $\{B, E\}$
Group 3 = $\{C\}$
Group 4 = $\{G.\}$ In a static scheduling algorithm approach, the set of all cells is partitioned a priori into a collection $\{Group_1, Group_2, \ldots, Group_K\}$ of K disjoint sets of cells. In each disjoint set $Group_i (1 \leq i \leq K)$, the cells are pairwise spatially disjoint, i.e., no two cells in the set overlap overlap with each other. The scheduling algorithm allows all members of a disjoint set to perform wireless operations at the same time. This results in spatial reuse of frequencies without any intercell interference. When all the members have completed operations, then all members of another disjoint set are allowed to perform simultaneous wireless operations. After each disjoint set of cells ($Group_1$, thru $Group_K$) is given its turn, the cycle of wireless operations is repeated again. A static scheduling algorithm is well suited to networks where the cells generate traffic with equal intensity.

The intensity of traffic (packets per second) will depend on factors such as:

Number of users within the cell. This varies with time since users are mobile.

Type of user applications that generate the communication traffic. Traffic due to different applications (such as voice, data, video) have different arrival characteristics and bandwidth requirements.

The above two factors can lead to significantly varying traffic intensities in a heavily loaded network. Static scheduling is not very robust for such networks.

This invention is directed to a robust scheduling method for scheduling traffic in multicell wireless local area networks. Robustness is the ability to achieve good spatial reuse without being very sensitive to variations in traffic intensities of cells. Wireless bandwidth of the cells is utilized in a manner driven by instantaneous traffic demands of cells. Robustness is achieved by dynamically scheduling wireless cell operations. The main idea of the method is to manage the initiation and termination of wireless operations in cells in a state-dependent manner. The method ensures that when a cell is scheduled to perform wireless operations, it will not conflict with any other wireless operation that may be going on at that instant. The method involves the selection and maintenance of simultaneous network wireless operations in a maximal independent set of nodes. A set of nodes in a graph is independent if no pair of nodes in the set is adjacent in the graph. In FIG. 5, set $\{A, F\}$ is an independent set of nodes. A set of nodes is maximally independent if the addition of another node to the set will make the set not independent. In FIG. 5, $\{A, F, D\}$ is a maximal independent set. Addition of another node to the set $\{A, F, D\}$ will create a pair of nodes adjacent to each other.

Scheduling of cell operations is performed by a central controller that is capable of sending control messages to and receiving control messages from the nodes (i.e., the base stations of the individual cells). A control message of the form $<START_{13}WIRELESS, BSID>$ is sent from the controller for initiating wireless operation at a node BSID. After completion of wireless operation in the cell corresponding to BSID, the node returns a control message to the controller. The controller initiates wireless operation in a maximal independent set of nodes, such as $\{A, F, D\}$, by sending $<START_{13}WIRELESS, A>$, $<START_{13}WIRELESS, F>$ and $<START_{13}WIRELESS, D>$ messages. The remaining set of nodes, $\{B, C, E, G\}$ are not initiated to perform wireless operation until one or more of the nodes $\{A, D, E\}$ complete their wireless operation. The central controller has knowledge of the Cell Interference Graph. It always knows the state of all cells, i.e., which individual base stations are performing wireless operations at any given instant. Therefore, it can schedule the cell operations in a conflict-free manner.

An outline of the Robust Scheduler is shown in Program RSA.

```
Program RSA: Outline of the Robust Scheduler
              Algorithm

Controller: begin;
    Read the cell Interference Graph G = (V,E);
    Create_Maximum Indepent-Set (G,S);
    /* Create S, an independent set of nodes in G, S∈V */
    /* Central Controller performs dynamic scheduling
       of nodes */
    /* S is the initial set of nodes in which wireless
       operation is initiated */
    WAITING - V; /* WAITING, the set of nodes currently
       not performing wireless */
    ACTIVE - φ; /* ACTIVE, the set of nodes performing
       wireless, is initially empty */
    for each u∈S, Schedule (u); /*
    Initiate wireless operation in u */
    while (wireless network is in operation) do;
       begin
         Wait for completion signals from network nodes
         currently ACTIVE;
         On reception of a completion signal from
         a node u∈ ACTIVE,
            do begin Initiate-Neighbors (u);
                     Unschedule (u);
               end;
       end;
end; /* of Controller */
Initiate_Neighbors (u);
    /* Examine the neighbors of u to check the nodes that
       can be initiated */
begin;
    CANDIDATES ← φ; /* The set of neighbors that may be
    initiated on completion of u */
    for each neighbor node v of u do
       if all neighbors of v are currently in WAITING /*
       i.e., not performing wireless operations */
          then CANDIDATES ← CANDIDATES U {v};
    end
    Sort the members of CANDIDATES using priority criterion,
    Pri_Crit;
    /* such as Longest Waiting Time first */
    while CANDIDATES ≠ φ do
    begin
       Let v be the next member of CANDIDATES;
       IF v can be initiated, /* all neighbors of v are in the
       WAITING state */
          then Schedule (v); /* Schedule completion time of v */
          CANDIDATES ← CANDIDATES - {v};
       end;
end; /* of Initiate_Neighbors */
Schedule (v);
    begin ACTIVE ← ACTIVE U {v};
          WAITING ← WAITING {v};
    end; /* of Schedule */
Unschedule (u);
    begin WAITING ← WAITNNG U {u};
          ACTIVE ← ACTIVE 0 {u}; /* u is marked as not ACTIVE */
end; /* of Unschedule */
Create_Maximal_Independent_Set (G,S);
```

Any good algorithm from Graph Theory literature can be used here for Create₁₃Maximal₁₃Independent₁₃Set.

The controller begins by reading in the Cell Interference Graph G=(V,E). In FIG. 5,
V={A, B, C, D, E, F, G}

$$E = \{(A, B), (B, F),$$
$$(A, G), (B, C),$$
$$(A, E), (B, G),$$
$$(C, D), (C, F),$$
$$(C, G), (D, E),$$
$$(D, G), (E, G)\}$$

It creates S, a maximal independent set of nodes that will be initially activated for performing wireless operations. For purposes of description, let S={C, E}. At any instant of time, the nodes that are performing wireless operation are included in the set ACTIVE. Initially ACTIVE={C, E}. Nodes that are WAITING for permission to perform wireless operation are included in the set WAITING. Initially WAITING={A, B, D, F, G}. As time evolves, a node alternates between the two sets. The controller initiates wireless operation in Node u by invoking the function, Schedule(u). Executing the function changes the state of the node from WAITING to ACTIVE. In addition, the maximum amount of time allowed for wireless operation, MaxTimeLimit is sent as a parameter of the START₁₃WIRELESS message from the controller to Node u. When the node receives the control message, it will perform wireless operation. If there is not enough traffic to communicate, then Node u performs wireless communication of all the traffic it has and then sends a completion signal before MaxTimeLimit has elapsed. If there is more traffic to communicate than can be accommodated within the time limit Node u uses all the allowed time and then sends a completion signal after exactly MaxTimeLimit has elapsed. All the traffic that was left over in this cycle of wireless operation will be held for transmission in a future cycle.

The controller executes the while-loop on an indefinite basis (i.e., as long as the wireless network is in operation). It waits for change of state to occur in one or more nodes. Such a change occurs when an ACTIVE node completes its wireless operation and sends a message to the controller signifying completion. On receiving such a signal from a node, say Node u, the controller invokes the procedure Initiate-Neighbors(u). Neighbors are adjacent nodes to u in the graph, which overlap u. In our example, let u be node c. The main purpose of the procedure is to examine which neighbors, if any, of Node u can be given another turn to perform wireless operation. The neighbors of node C are {B, D, F, G}. Of these, nodes {B, F} qualify for wireless operation. Nodes {A, D, G} do not qualify because they are adjacent to ACTIVE node E. If there are multiple neighbor nodes that qualify for another turn, the Initiate₁₃Neighbors procedure prioritizes the qualifying nodes and activates one or more of them in that priority sequence. A set called CANDIDATES containing the neighbor nodes of u that can be activated is constructed. The set includes each node v that satisfies both of the following conditions: a) Node v is a neighbor of Node u, and b) Node v is in WAITING mode and all neighbors of Node v other than Node u are in WAITING mode (i.e., not performing wireless operation). In the example CANDIDATES is {B, F}. After the set CANDIDATES is formed, one of the following three outcomes are possible. If the set is null, then no neighbors of Node u can be activated. If the set contains exactly one element, then the choice of which node to activate is unique. If there are multiple elements in the set CANDIDATES, the procedure uses one of the following priority sequencing criteria Pri₁₃Crit for ordering the candidate nodes.

A neighbor node that has been WAITING the longest amount of time since the completion of its previous turn of wireless operation is preferred to other neighbors, or A neighbor node that is expected to have the most traffic for wireless transmission is preferred to other neighbors. This criterion requires the controller know the average traffic rates at the individual nodes. The information can be estimated using data obtained from runtime traffic monitoring. For example, whenever a completion signal from a node arrives, the controller notes down the amount of traffic sent by that node and updates the average traffic rate from the node.

Other choices for priority sequencing of the candidate nodes can be readily included within the method of the invention. Such criteria may include:

Periodic scheduling of nodes that generate real-time traffic (such nodes will be given the opportunity to perform wireless at least once every $\Delta$ seconds, where $\Delta$ is a design choice).

Explicitly stated priority ordering criteria of the nodes (the network operator may partition the nodes into different classes of customers and assign them different priority levels). If the scheduler has multiple choice of nodes eligible for scheduling, then preference is always given to the node of highest priority.

Suppose the neighbor nodes in set CANDIDATES have been prioritized. Let this be the set {B, F}. The first node in the set, say Node v, is initiated by invoking Schedule(v). If w$\delta$ CANDIDATES and Node w is adjacent to Node v, then the initiation of Node v will make Node w ineligible for wireless operation until Node v completes its latest turn. In such a case, Node w is removed from CANDIDATES. In our example, when node B is initiated, then node F becomes ineligible for wireless operation at least until node B completes its wireless operation. Therefore node F is removed from the set CANDIDATES. After all nodes in CANDIDATES that are adjacent to Node v have been removed, the next candidate node in the set, if any, is scheduled. The process of scheduling the neighbors of Node u is continued until the set CANDIDATES becomes empty. The execution of Initiate$_{13}$Neighbors(u) is finished.

The controller invokes Unschedule(u). Executing the function changes the state of Node u from ACTIVE to WAITING. The controller then waits for more completion messages to arrive before responding to them by scheduling additional wireless cell operations.

Figures 6, 6A:
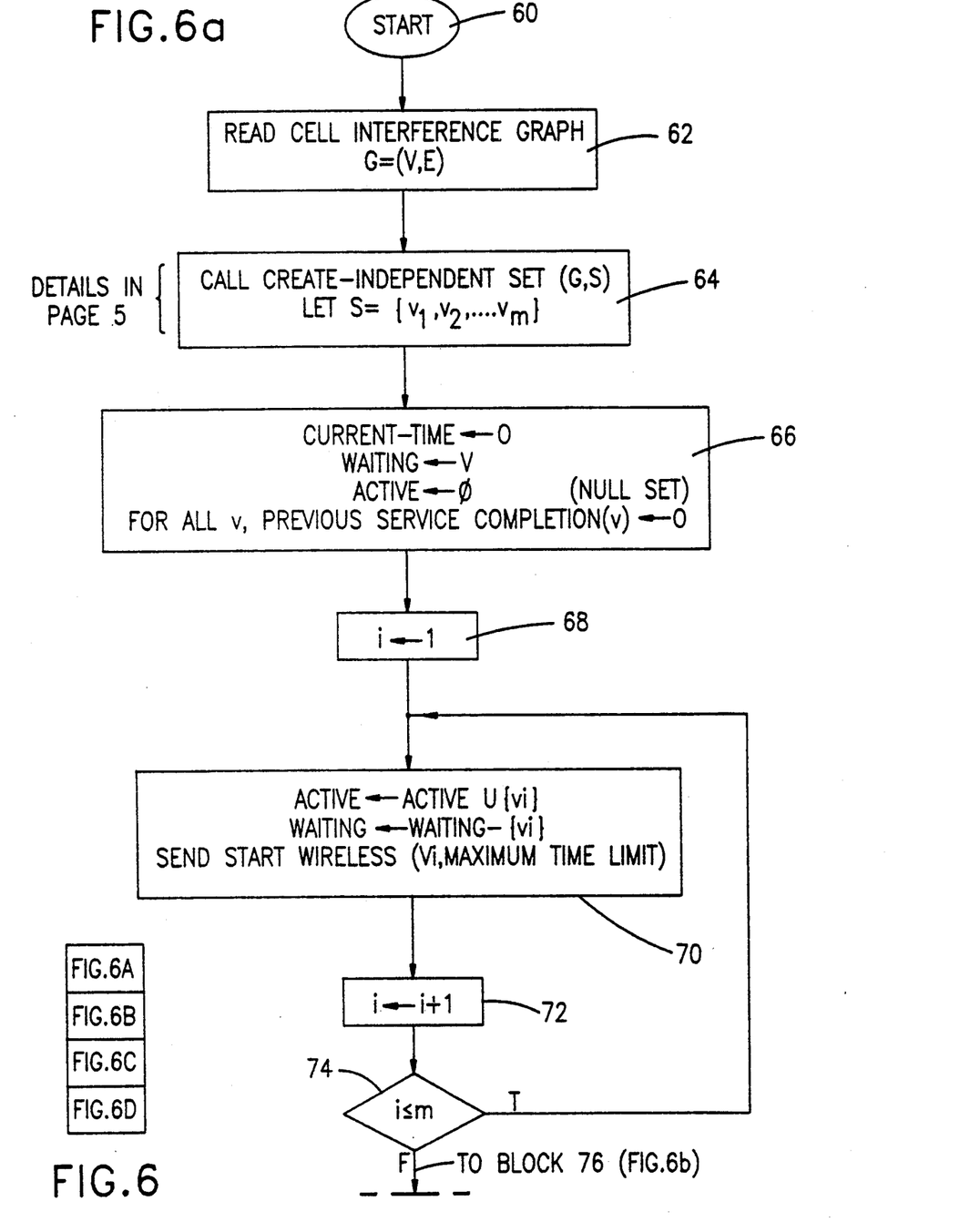
FIGS. 6a to 6d when taken together as shown in FIG. 6 comprise a flow chart of the robust scheduling mechanism according to the invention.

The flow chart of the robust scheduling mechanism, the previously described Program RSA, will now be described. Referring to FIG. 6a, the process begins at 60. At block 62 the cell interference graph (FIG. 5) is read into the system. As previously described, the graph is defined by the equation:

$$G=(V,E)$$

where V = a set of nodes
E = a set of edges where an edge connects a pair of nodes In block 64 the cell interference graph G from block 62 is transformed to a maximum independent set of vertices S. With respect to FIG. 5, a maximal independent set of vertices are {C F}. S is defined by:

$$S = \{v_1, v_2, v_3, \ldots v_m\}$$

where the vertices $v_1, v_2, v_3, \ldots, v_m$ are all members of the set V, and
S is a subset of V.

Figure 7:
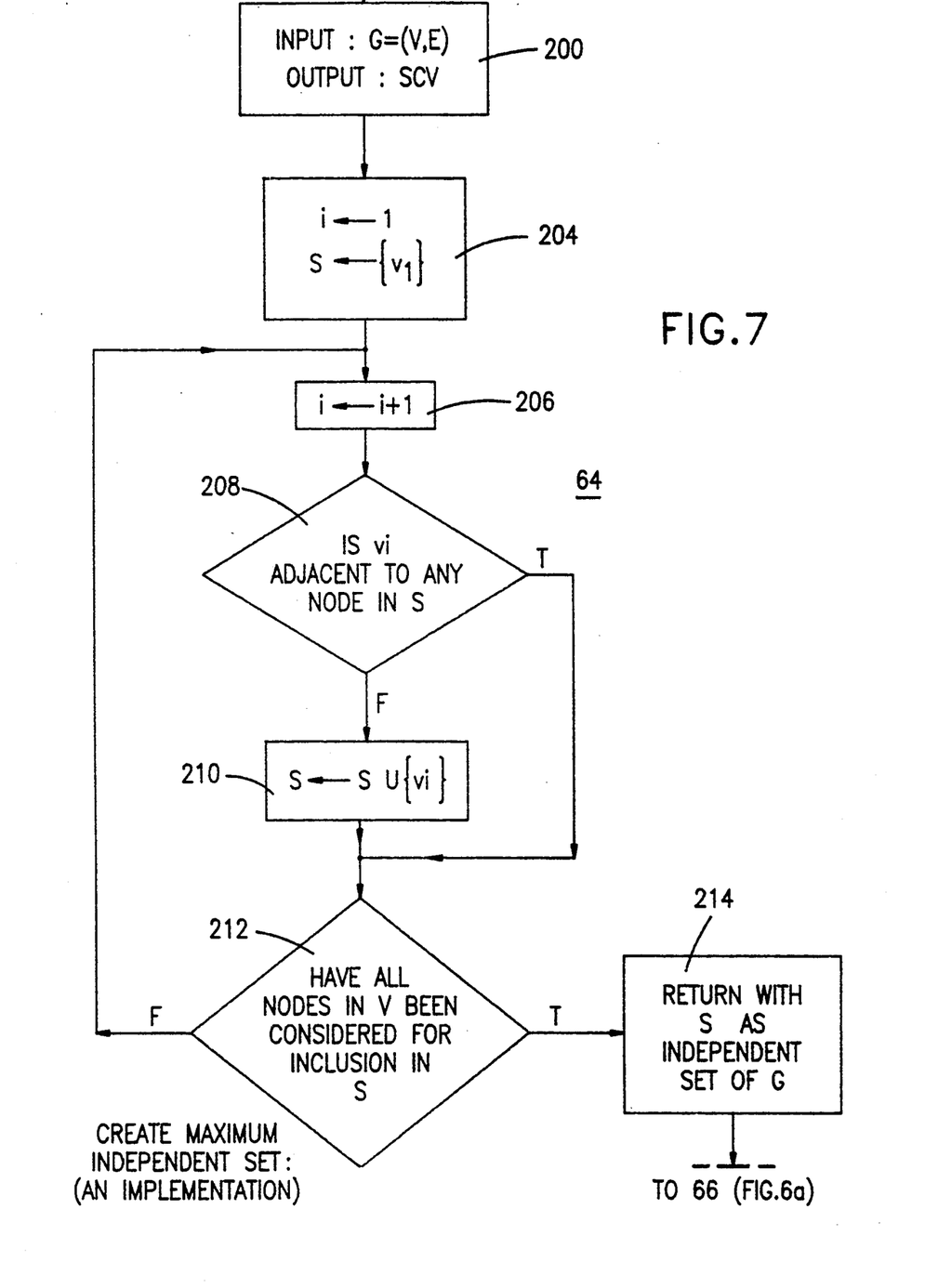

Refer now to FIG. 7 which is a detailed block diagram of block 64 (FIG. 6a). At block 200 G is input from block 62 (FIG. 6a) and S is the output; This means that S is a subset of V. At block 204 a variable i is initialized to 1, and set S is initialized to $V_1$. At block 206 i is incremented by 1 to begin a loop to examine all elements of set V. That is, $v_1, v_2, \ldots, v_m$. At decision block 208 a determination is made whether $V_i$ is adjacent to any node in S. If not, S is set equal to S U $\{V_i\}$ in block 210. If so, or after block 210, proceed to decision block 212 where a determination is made if all nodes in V have been considered for inclusion in S. If not, a return is made to block 206 where i is again incremented by 1 and the logic proceeds as just explained. If so, proceed to block 214 where S is now a maximal independent set of G which is applied to block 66 of FIG. 6a.

Figure 6B:
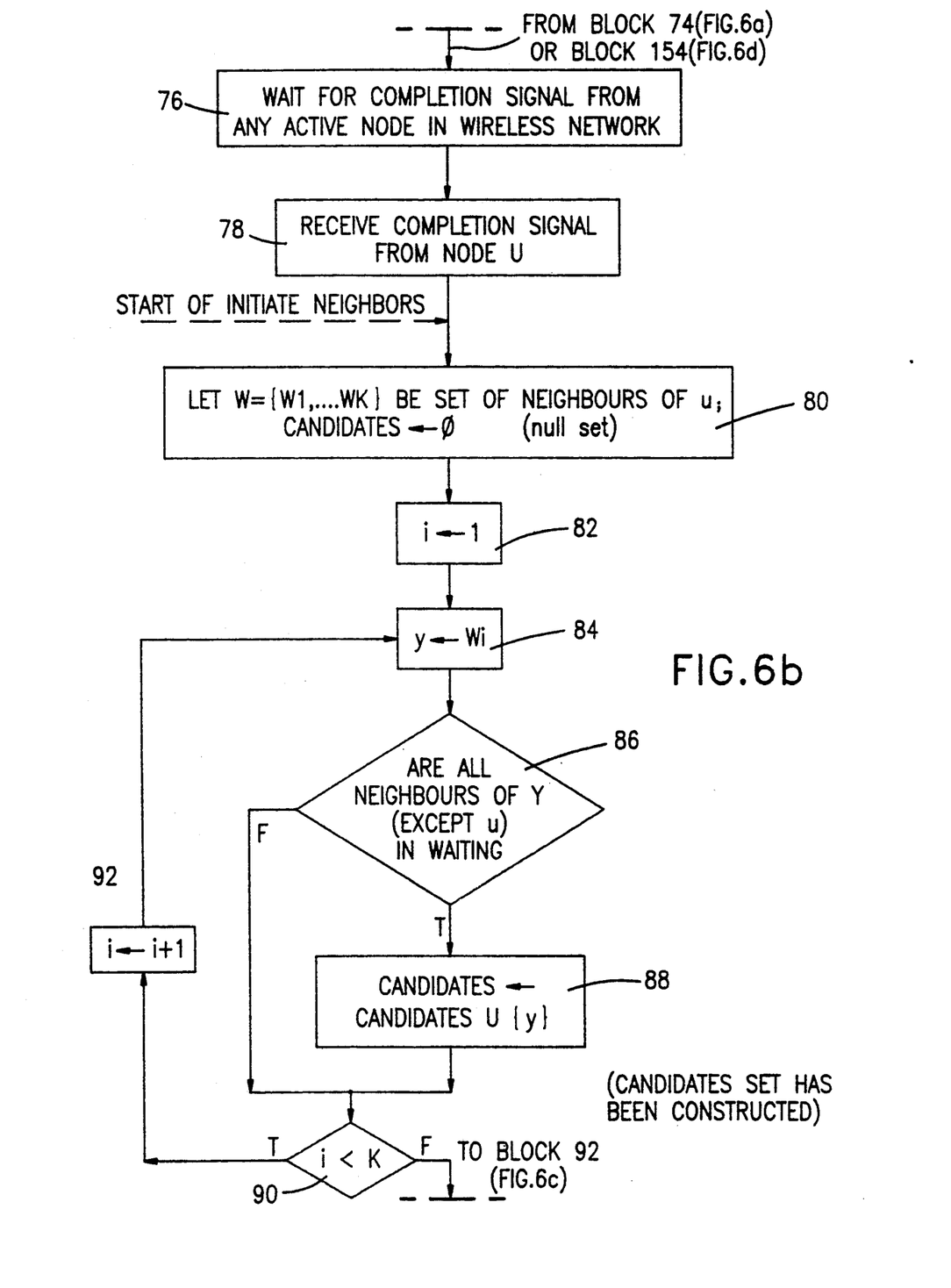
Figure 6C:
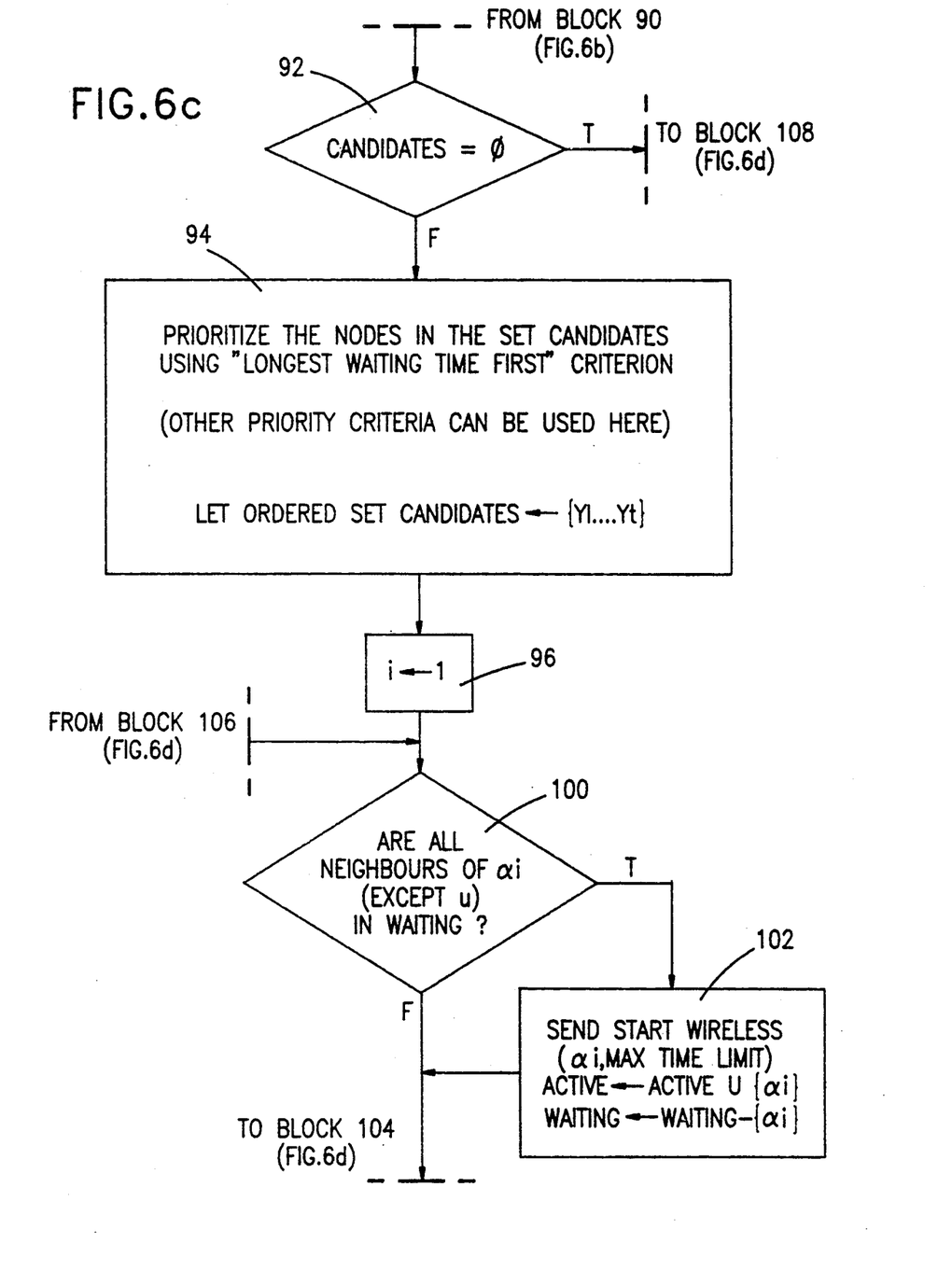

Return now to FIG. 6a where S from block 64 is applied to block 66 where variable current-time is set to 0; WAITING is initialized to V, where WAITING is a set of vertices; ACTIVE is initialized to $\phi$, where $\phi$ is a null set. A node is either in an ACTIVE or WAITING state. When ACTIVE there is wireless communication between the base station and mobile units owned by it. When WAITING, there is no such communication. At block 68 a variable i is initialized to 1, with each i being indicative of a vertices in the set S. At block 70 a scheduling function is implemented. ACTIVE is initialized to ACTIVE U$\{V_i\}$, where U denotes union, that is nodes may be added to the set ACTIVE. Waiting is decremented by $\{V_i\}$, by deleting node $V_i$ from the set WAITING. A node is either ACTIVE or WAITING, and may be moved between these two states. Wireless communication is started for node Vi with a maximum time limit set for communication. At block 72 i is incremented by 1, and at decision block 74 a determination is made if i $\leq$ m, that is, have all nodes Vi in the set S been considered. If so, a return is made to block 70 to proceed as just explained. If not, proceed to FIG. 6b, block 76 to wait for a completion message from any ACTIVE node in the wireless network. At block 78 a completion signal is received from one of the ACTIVE nodes U. An initiation of neighbor is begun at block 80 to determine which neighbors are candidates to go from WAITING state to ACTIVE state. Neighbors are adjacent nodes to U in the graph, which overlap U. W is the set of WAITING neighbors. Suppose $W_1, W_2, \ldots, W_k$ are k neighbors of node u. At block 82 a variable y is set equal to Wi, where Wi is the set of candidates of waiting neighbors in block 80. At decision block 86 a determination is made if all overlap neighbors of y, other than u, are in WAITING. If all neighbors are in WAITING proceed to block 88 where the CANDIDATES set is enlarged by including y. If all neighbors are not in WAITING proceed to block 90 where a determination is made if i<k, where k is the size of the set in block 80. If i<k proceed to block 92 where i is incremented by 1 and return to block 84 to proceed as just explained. If i is not less than k proceed to FIG. 6c, block 92 where a determination is made if CANDIDATES are null. If so, proceed to block 108 (FIG. 6d), the function of which will be described shortly relative to FIG. 6d. If not, proceed to block 94 where the candidate nodes set to go to from a WAITING state to an ACTIVE state are prioritized according to a priority criteria such as "longest WAITING time candidate is first". Let the ordered set be denoted y1, ..., yt have t nodes. At block 96 a variable i is initialized to 1, and at decision block 100 a determination is made if all neighbors of $\gamma$i, except U, are in WAITING. If all neighbors are in WAITING proceed to block 102 where a scheduling function is implemented which is similar to that implemented in block 70 (FIG. 6a). Again, a node is either ACTIVE or WAITING, and may be moved between these two states. Wireless communication is started for node γ i with a maximum time limit set for communication.

Figure 6D:
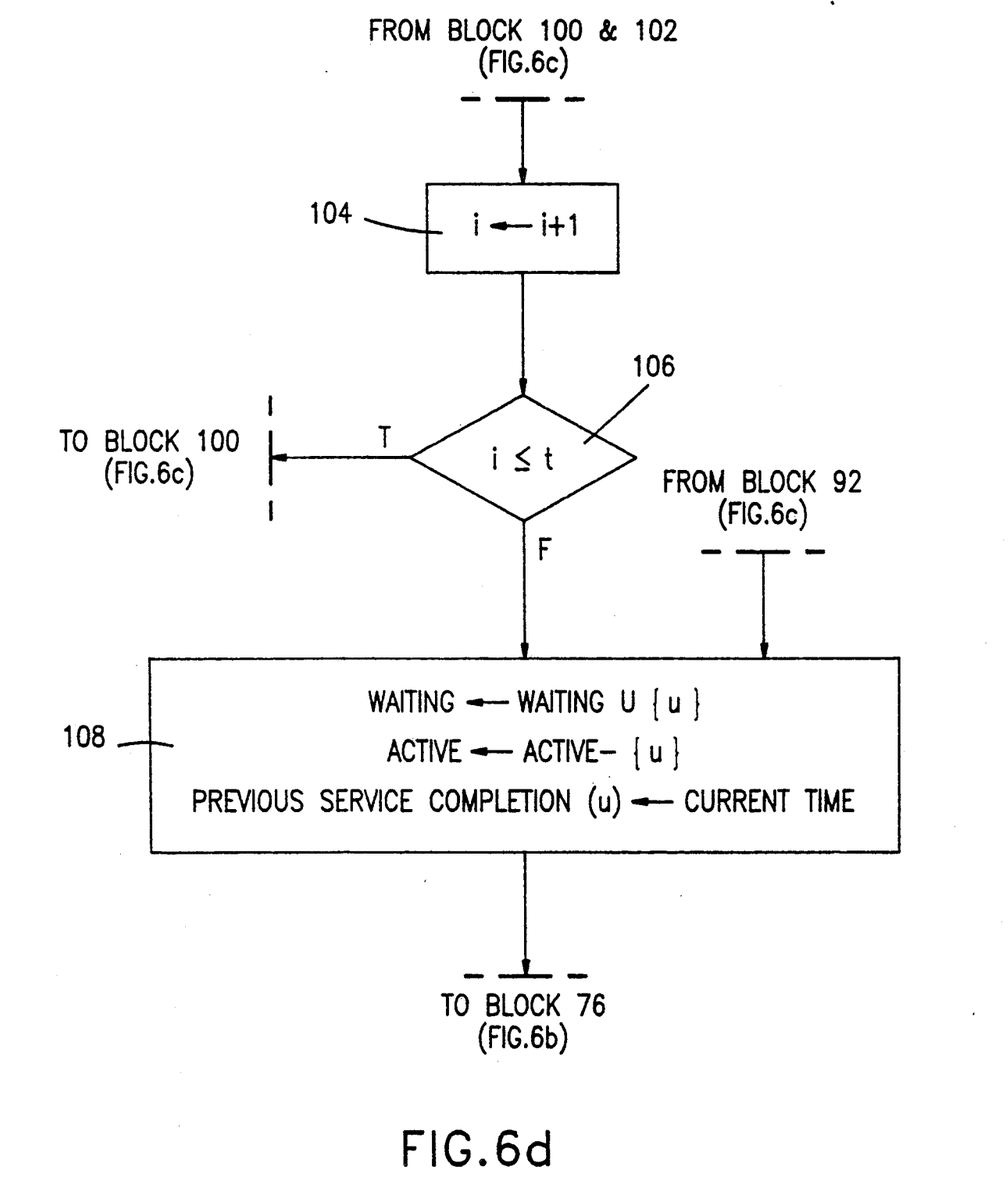

Proceed now to FIG. 6d, block 104 where i is incremented by 1. At decision block 106 a determination is made if i<t. If so, proceed to block 100 (FIG. 6c) and proceed as just explained. If not, proceed to block 108 where node U is moved from the ACTIVE state to the WAITING state. This is indicative of the completion of action based on a completion message from a node to the controller. Return to block 76 (FIG. 6b) to proceed as previously explained to wait for the next completion signal.

Having thus described my invention, what I claim as new, and desire to secure by Letters Patent is:

1. A method of dynamically managing wireless communications in a wireless communications network comprised of a local area network connected to a plurality of nodes defined as base stations, each of which has a geographic area, defined as a cell, within which mobile stations can communicate with a node, with at least two of the cells overlapping with one another, with each such node being capable of performing bidirectional wireless communication with one or more of said mobile stations under control of a controller, said method comprising the steps of:

reading a cell interference graph $G=(V, E)$ into said controller, where V is the plurality of nodes and E is the set of all adjacent nodes;

determining a maximal independent set of the nodes V, where a set of nodes in G is independent if no pair of nodes in the set is adjacent in the graph, and is maximally independent if the addition of another node in the set will make the set not independent;

activating said maximal independent set of nodes for performing wireless communication with mobile stations in their respective cells, with said maximal set of nodes being in a set termed ACTIVE; and putting nodes which are not in said maximal independent set of nodes in a set termed WAITING to wait for permission to enter the set ACTIVE.

2. The method of claim 1, including the steps of:

sending a completion signal to said controller from a given one of said nodes in an ACTIVE state when it has completed wireless communications;

examining which neighbor nodes, of said given one of said nodes, which are in said set WAITING and are not adjacent to another active node, with such nodes being put in a set termed CANDIDATES; and examining and reordering which nodes in said set CANDIDATE can be moved into the set ACTIVE according to a predetermined criteria.

3. The method of claim 2, including the step of:

moving a first one of the examined and reordered nodes from said set CANDIDATE into said set ACTIVE for performing wireless communication with mobile stations in its cell.

4. The method of claim 3, including the step of:

removing from said set CANDIDATE any node that is adjacent to said first one of said nodes just put in said set ACTIVE.

5. In a wireless communications network, the combination comprising:

a local area network;

a plurality of nodes connected to said local area network, each of which has a geographic area called a cell within which mobile stations can perform communications with a node, with at least two of the cells overlapping with one another;

a plurality of said mobile stations which can perform communications with nodes whose cells the mobile stations are occupying;

a controller which controls communications between said plurality of nodes and said plurality of mobile stations, said controller including:

means for reading a cell interference graph $G=(V, E)$ into said controller, where V is the plurality of nodes and E is the set of all adjacent nodes;

means for determining a maximal independent set of the nodes V, where a set of nodes in G is independent if no pair of nodes in the set is adjacent in the graph, and is maximally independent if the addition of another node in the set will make the set not independent;

means for activating said maximal independent set of nodes for performing wireless communication with mobile stations in their respective cells, with said maximal set of nodes being in a set termed ACTIVE; and means for putting nodes which are not in said maximal independent set of nodes in a set termed WAITING to wait for permission to enter the set ACTIVE.

6. The combination claimed in claim 5, including:

means for sending a completion signal to said controller from a given one of said nodes in an ACTIVE state when it has completed wireless communications;

means for examining which neighbor nodes, of said given one of said nodes, which are in said set WAITING and are not adjacent to another active node, with such nodes being put in a set termed CANDIDATES; and means for examining and reordering which nodes in said set CANDIDATE can be moved into the set ACTIVE according to a predetermined criteria.

7. The combination claimed in claim 6, including:

means for moving a first one of the examined and reordered nodes from said set CANDIDATE into said set ACTIVE for performing wireless communication with mobile stations in its cell.

8. The combination claimed in claim 7, including:

means for removing from said set CANDIDATE any node that is adjacent to said first one of said nodes just put in said set ACTIVE.

* * * * *